United States Patent [19]
Clohessy

[11] Patent Number: 5,573,311
[45] Date of Patent: Nov. 12, 1996

[54] ANTI-ROTATION DEVICE FOR WHEEL SPINDLE NUT

[75] Inventor: Kip E. Clohessy, Milwaukie, Oreg.

[73] Assignee: Warn Industries, Inc., Milwaukie, Oreg.

[21] Appl. No.: 270,365

[22] Filed: Jul. 5, 1994

[51] Int. Cl.⁶ .................................................. B60B 27/06
[52] U.S. Cl. ...................... 301/105.1; 301/124.1; 301/35.55; 411/217; 411/948
[58] Field of Search .................. 301/105.1, 111, 301/112, 117, 118, 120, 124.1, 131, 35.58, 35.55, 35.63; 411/129, 133, 140, 114, 115, 216, 217, 939, 948

[56] References Cited

U.S. PATENT DOCUMENTS

| | | | |
|---|---|---|---|
| 1,133,860 | 3/1915 | Herman | 411/217 |
| 1,218,072 | 3/1917 | Foster | 411/216 |
| 1,616,338 | 2/1927 | Steinkritzer | 411/114 |
| 3,164,190 | 1/1965 | Peratallada | 411/948 X |
| 3,294,141 | 12/1966 | Schotthofer et al. | 411/222 |
| 4,812,094 | 3/1989 | Grube | 301/124.1 X |

FOREIGN PATENT DOCUMENTS

| 695187 | 10/1930 | France | 411/133 |
|---|---|---|---|

*Primary Examiner*—Russell D. Stormer
*Attorney, Agent, or Firm*—Klarquist, Sparkman, Campbell, Leigh & Whinston, LLP

[57] ABSTRACT

A retainer for preventing rotation of a spindle nut relative to a wheel spindle. The retainer engages a key way of the spindle and a groove of the spindle nut to prevent rotation of the spindle nut relative to the spindle. The retainer has a semi-circular body that surrounds the end of the spindle. The retainer has a radially inward projecting tab and an axially extending leg from the tab that engages the key way. The leg in addition to engaging the key way engages the groove of the spindle nut. The spindle nut preferably includes a recess in which the body portion of the retainer is nested.

5 Claims, 2 Drawing Sheets

ANTI-ROTATION DEVICE FOR WHEEL SPINDLE NUT

FIELD OF THE INVENTION

This invention relates to devices for preventing rotation of retainers and in particular relates to a device for preventing rotation of a wheel spindle nut when mounted on a wheel spindle of a vehicle.

BACKGROUND OF THE INVENTION

Bearings mounted on a wheel spindle of a vehicle generally are retained by a spindle nut. The nut is threadably installed on the end of the spindle to engage a race of a bearing. The nut is torqued to positively retain the bearings and to also establish a pre-load on the bearings. The nut must be secured in its torqued position so that the nut will not become loosened or in the rare instance be tightened further. The nut is secured in its torqued position to maintain the pre-load on the bearings and also for safety reasons. The nut once tightened to the desired pre-load is prevented from rotating relative to the spindle by a locking or retention device.

Wheel spindles such as those utilized for four wheel drive vehicles, front wheel drive vehicles and similar applications require a locking device that does not protrude through the center of the wheel spindle. The locking device therefore must be mountable on the periphery of the wheel spindle and be arranged to secure the spindle nut in a set position.

Typically the wheel spindle has a key way in its threaded portion that is utilized by the locking device to prevent rotation of the spindle nut. Various forms of spindle locking devices have been utilized in the past. One example considered most similar to the present invention is an elongated keying pin. The spindle nut is provided with multiple axially directed grooves symmetrically positioned in its threaded periphery. When the desired torque is achieved, the nut is adjusted to align or superimpose the closest of the multiple grooves with the spindle key way. The keying pin is inserted into the aligned groove and key way to prevent further rotation of the spindle nut. This keying pin accomplishes the desired locking of the spindle nut. However, the keying pin is difficult to handle and difficult to detect as it becomes buried between the spindle and nut. Detection is important for inspection purposes and handling difficulties impede assembly. Furthermore, the buried keying pin can be difficult to remove when disassembly is necessary, e.g., for maintenance purposes.

BRIEF SUMMARY OF THE INVENTION

The present invention is a spindle nut retainer that is readily installed to prevent rotation of the spindle nut relative to the wheel spindle, it is easy to detect for inspection purposes and it is readily removable for maintenance purposes.

A preferred embodiment of the present invention has a spindle nut with multiple internal axial grooves in its threaded portion as in the example described. The spindle nut is threadably installed on a threaded end of a spindle to engage and retain bearings. The threaded end of the spindle has a formed key way. As is typical, the spindle nut is torqued to an established level to provide a pre-load on the bearings and then adjusted to align or superimpose the closest groove with the key way.

The retainer of the present invention has a body portion that is somewhat semi-circular and is arranged to surround the threaded end of the spindle. The retainer has a tab portion that projects radially inward and has a leg (similar to the pin of the example described) extending axially from the projecting tab. The leg is arranged to engage an axial groove of the spindle nut and one side edge of the spindle key way. A shoulder formed by the projecting tab engages the opposite side edge of the spindle key way.

The retainer is simply slipped over the threaded end of the spindle with the extending leg of the retainer fitting in the slot of the spindle nut and engaging one side edge of the spindle key way. The extending tab engages the opposite side of the key way of the threaded spindle end. The body portion allows for easy handling during assembly, easy removal for maintenance, and is readily detected in a quality control inspection.

Refer now to the drawings and the detailed description for a full understanding of the invention.

DESCRIPTION OF THE PREFERRED EMBODIMENT

Figure 1:
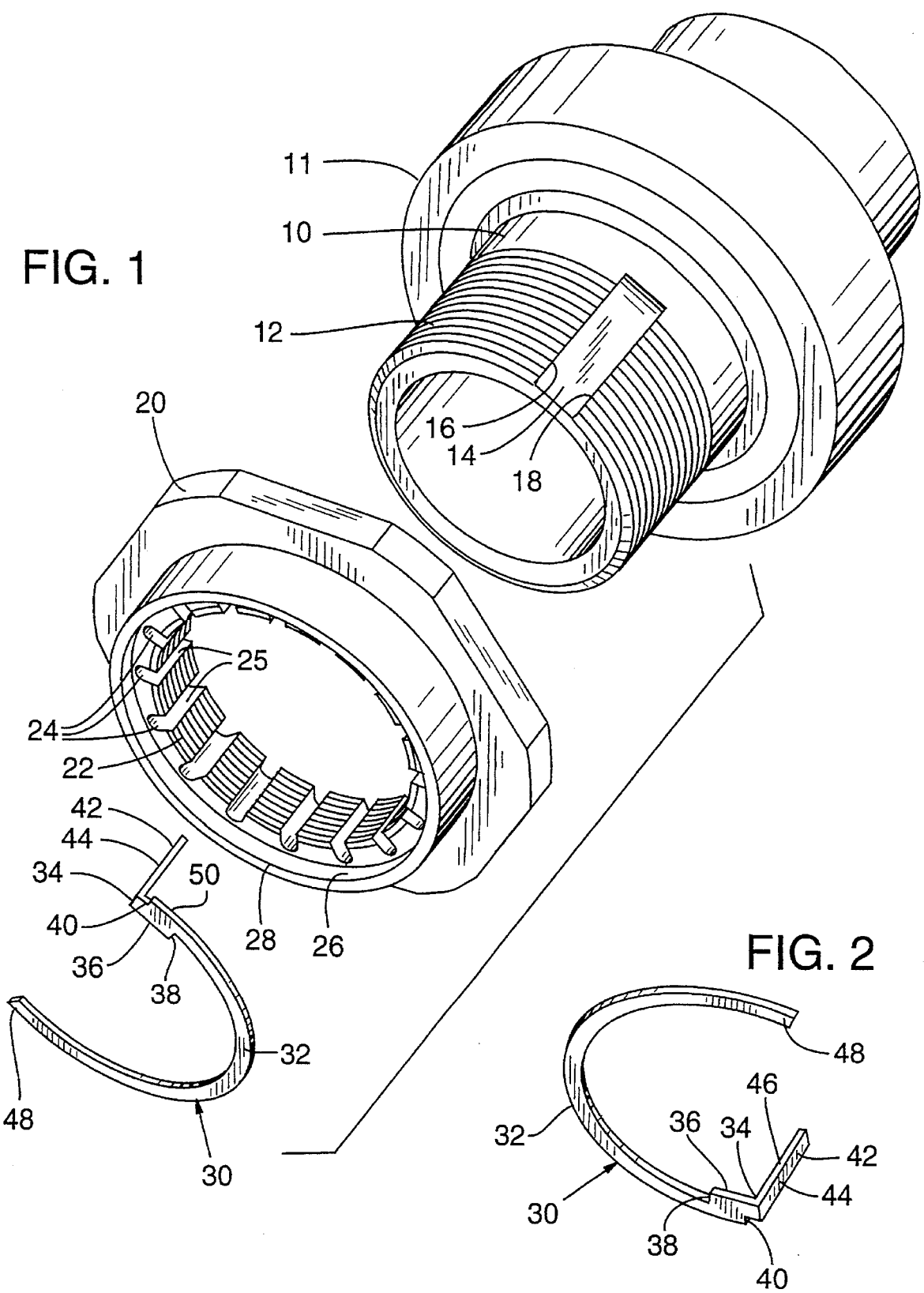
FIG. 1 is an exploded perspective view of a wheel spindle end, a spindle nut and a spindle nut retainer of the present invention.

Refer now to FIG. 1 of the drawings which illustrates in exploded perspective view an end of a vehicle wheel spindle 10, a spindle nut 20 and a spindle nut retainer 30. As shown, the spindle 10 has a threaded end 12 and a key way 14 is formed in the threaded end 12. It will be appreciated that the spindle 10 may be of either the live spindle or dead spindle type. Basically a dead spindle is non-rotative relative to the vehicle and rotatably supports a wheel hub on which a wheel of the vehicle will be mounted. A live spindle is basically rotatably mounted on bearings in a fixed portion of the vehicle referred to as the knuckle. A wheel of the vehicle is mounted to the spindle.

Figure 3:
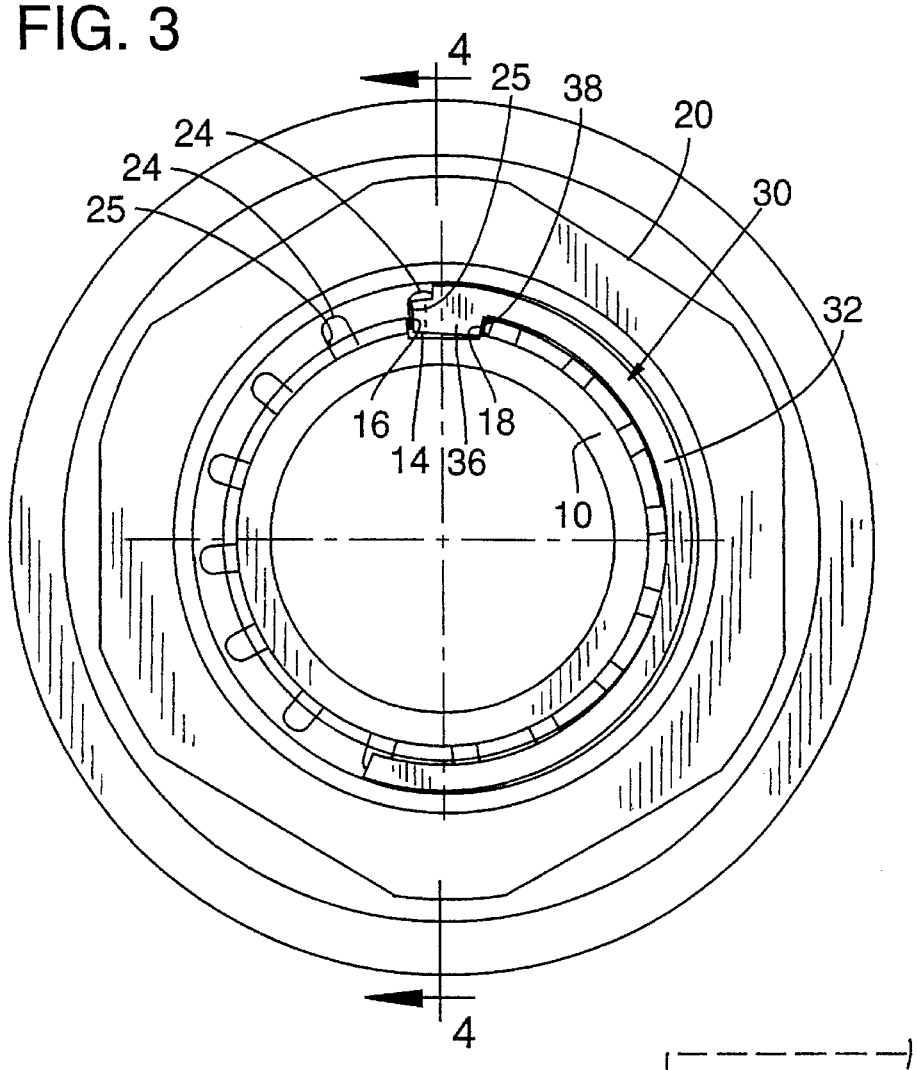
FIG. 3 is an end view of the wheel spindle of FIG. 1 with the spindle nut and the retainer mounted thereon; and, FIG. 4 is a view as viewed on view lines 4—4 of FIG. 3.
Figure 4:
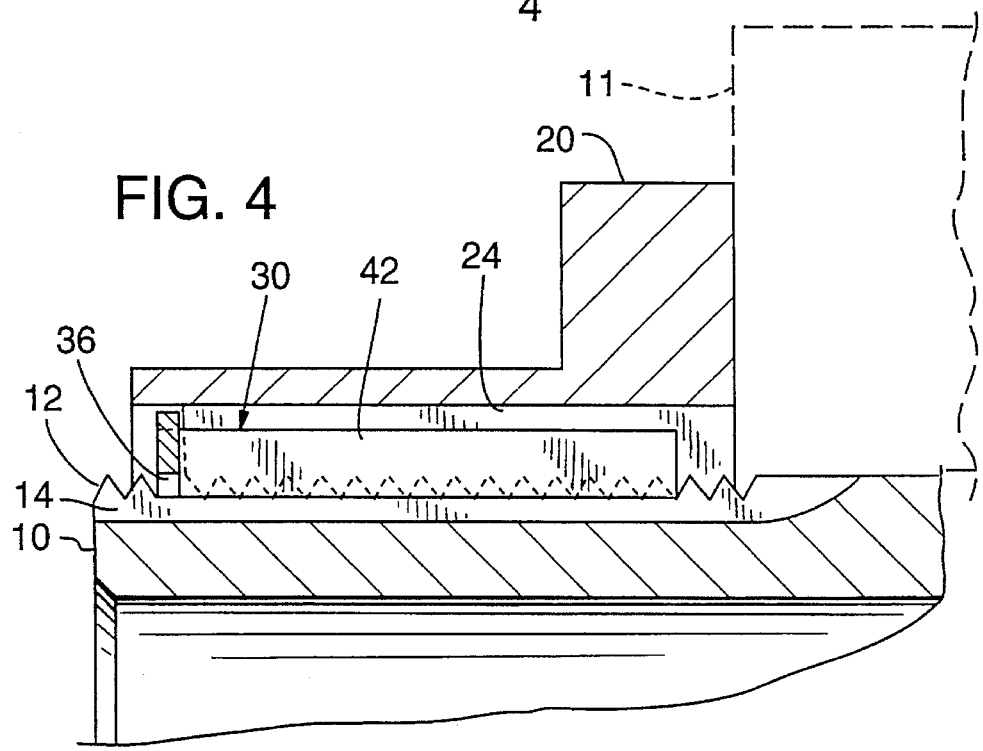

Bearings 11, only one of which is shown, are installed on the spindle 10 whether the spindle 10 be a live-type spindle or a dead-type spindle and the bearings are secured by the spindle nut 20 as seen in FIGS. 3 and 4.

In this embodiment, the spindle nut 20 has internal threads 22 and has multiple axial grooves or slots 24 formed in the threaded portion 22. A circular recess 26 concentric to the threaded portion 22 is formed in the face 28 of the spindle nut 20.

Figure 2:
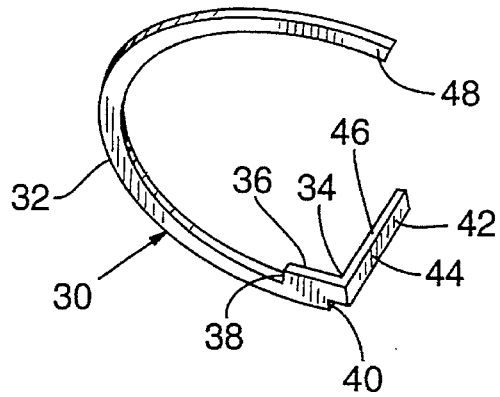
FIG. 2 is another view of the spindle nut retainer of the present invention.

The retainer 30 as shown in FIGS. 1 and 2 is a pre-formed semi-circular member that has a body portion 32 that is configured to surround the threaded end 12 of the spindle 10 (i.e. the semi-circular body portion of the retainer has an internal diameter at least equal to, but preferably slightly greater than, the diameter of threaded end 12). The retainer 30 is arranged to engage, upon installation, both the key way 14 of the spindle 10 and a slot 24 of the spindle nut 20 when the spindle nut 20 is threadably installed on the spindle 10. An end 34 of the body 32 has a projecting tab 36 that extends radially inward. Shoulders 38 and 40 are formed between the projecting tab 36 and the body 32 of the retainer 30 as shown in FIGS. 1 and 2. A leg 42 extends axially from the end of the projecting tab 36 with the leg being substantially normal to the projecting tab 36 and the body 32. The leg 42 has a side 44 and a top 46.

Refer now to FIGS. 3 and 4. The spindle nut 20 and the retainer 30 are shown installed on the wheel spindle 10. The nut 20 is threadably installed on the end 12 of the spindle 10. The retainer is installed to prevent rotation of the spindle nut 20 relative to the spindle 10. The recess 26 of the spindle nut 20 is sized to receive the body portion 32 of the retainer 30. As shown a side edge 25 of a slot 24 of the spindle nut 20 is aligned with a side edge 16 of the key way 14 of the spindle 10. The side edge 25 of the slot 24 and side edges 16, 18 of the key way 14 are best seen in FIG. 1. The slot 24 and key way thus aligned permits inserting the extending leg 42 of the retainer 30 into both the slot 24 and the key way 14. The projecting tab 36 is received in the key way 14 with shoulder 38 of the retainer 30 against side 18 of the key way 14. The distance between the shoulder 38 and the face (side) 44 of the leg 42 of the retainer 30 is slightly less than the width of the key way 14 so that the projecting tab 36 and the extending leg 42 will fit readily into the key way 14. The leg 42 of the retainer 30 engages the slot 24 of the spindle nut 20 as well as engaging the side edge 16 of the key way 14 of the spindle 10. The side 44 of the leg 42 engages the side edge 16 of the key way 14. The shoulder 38 of the retainer 30 engages the side edge 18 of the key way 14 of the spindle 10. The retainer 30 in engagement with both the spindle 10 and the spindle nut 20 will thus prevent rotation of the spindle nut 20 relative to the spindle 10.

A primary advantage of the retainer as described is to facilitate assembly. As noted, the portion 32 is substantially semi-circular, i.e., it is about 180 degrees of a circle. The width of the retainer, i.e., from one end 48 to the other end 50, is about two inches. With reference to FIG. 1, an assembly line worker merely grasps the retainer 30, e.g., with thumb at end 48 and forefinger on end 50 of portion 32, and slides the retainer into place. As viewed in FIG. 3, the portion 32 seats in the recess 26 and is non-interfering with any assembly of components to the spindle. Yet it is clearly visible and scanning devices are readily equipped to inspect the spindle and to detect the presence or absence of the retainer. The single pin-type retainer described in the background section is both difficult to handle and detect. Furthermore, removal of the retainer of the present invention is readily accomplished by prying up end 48 sufficient to slide a blade under portion 32 to expose enough of the key of the retainer to grip and remove it from the spindle.

Those skilled in the art will recognize that modifications and variations may be made without departing from the true spirit and scope of the invention. The invention is therefore not to be determined from the embodiment described and illustrated but is to be determined from the appended claims.

What is claimed is:

1. In combination with a wheel spindle and a spindle nut, a device for preventing rotation of the spindle nut relative to the spindle, comprising:

a wheel spindle having a threaded end of a first diameter;

a key way formed on the threaded end;

a spindle nut having internal threads and axial grooves formed in the threads, said spindle nut threadably installable on the threaded end of the spindle for alignment of one of the grooves with the key way;

a preformed retainer having a body portion that is partially circular in configuration with an internal diameter at least equal to said first diameter to partially surround the spindle end, and a leg portion that extends normal to the body portion and configured to fit the aligned groove and key way, said retainer mountable to the spindle and spindle nut when said nut is mounted on said spindle, said retainer leg portion in engagement with said aligned groove and said key way and said body portion abutting the spindle nut and surrounding said spindle to thereby prevent rotation of said spindle nut relative to said spindle while providing easy installation and detection of the retainer.

2. In combination with a wheel spindle and a spindle nut, a device for preventing rotation of the spindle nut relative to the spindle comprising:

a wheel spindle having a threaded end;

a key way formed on the threaded end;

a spindle nut having internal threads and axial grooves formed in the threads, said spindle nut threadably installable on the threaded end of the spindle for alignment of one of the grooves with the key way;

a retainer having a body portion that is partially circular in configuration to partially surround the spindle end, a radially inward projecting tab, and a leg extending axially from said tab normal to the body portion and configured to fit the aligned groove and key way, said retainer mountable to the spindle and spindle nut when said nut is mounted on said spindle, with said tab and said leg in engagement with said key way and said leg further in engagement with said groove when said retainer is mounted to said spindle and said spindle nut, and said body portion abutting the spindle nut and surrounding said spindle to thereby prevent rotation of said spindle nut relative to said spindle while providing easy installation and detection of the retainer.

3. In combination with a wheel spindle and a spindle nut, a device for preventing rotation of the spindle nut relative to the spindle as defined in claim 2, wherein:

said retainer body is semi-circular in configuration providing for easy grasping by the thumb and forefinger of a worker, said body surrounding said threads of said spindle when said retainer is mounted to said spindle and said spindle nut.

4. In combination with a wheel spindle and a spindle nut, a device for preventing rotation of the spindle nut relative to the spindle as defined in claim 3, wherein:

a recess is formed on said spindle nut, said recess concentric to said threads of said spindle nut, and said body of said retainer fitting in said recess when said retainer is mounted to said spindle and said spindle nut.

5. In combination with a wheel spindle and a spindle nut, a device for preventing rotation of the spindle nut relative to the spindle as defined in claim 4, wherein:

said tab extends radially inward from said body and defining a shoulder;

said key way has side edges;

said leg has a side;

said shoulder in engagement with one side edge and said side of said leg in engagement with an other side edge of said key way when said retainer is mounted to said spindle and said spindle nut.

* * * * *